United States Patent
Tichborne et al.

(10) Patent No.: US 9,676,492 B2
(45) Date of Patent: Jun. 13, 2017

(54) DEHUMIDIFIER

(71) Applicant: AIRBUS OPERATIONS LIMITED, Bristol (GB)

(72) Inventors: Franklin Tichborne, Bristol (GB); Joseph K-W Lam, Bristol (GB); Alessio Cipullo, Bristol (GB); Stephen E. Burnell, Chippenham (GB)

(73) Assignee: Airbus Operations Limited, Bristol (GB)

( * ) Notice: Subject to any disclaimer, the term of this patent is extended or adjusted under 35 U.S.C. 154(b) by 271 days.

(21) Appl. No.: 14/529,372

(22) Filed: Oct. 31, 2014

(65) Prior Publication Data

US 2015/0122814 A1 May 7, 2015

(30) Foreign Application Priority Data

Nov. 1, 2013 (GB) .................................. 1319338.8

(51) Int. Cl.
| | | |
|---|---|---|
| *B01D 53/22* | (2006.01) | |
| *B64D 37/32* | (2006.01) | |
| *B01D 53/26* | (2006.01) | |
| *H01M 8/04119* | (2016.01) | |
| *B64D 41/00* | (2006.01) | |

(52) U.S. Cl.
CPC ............ *B64D 37/32* (2013.01); *B01D 53/268* (2013.01); *H01M 8/04164* (2013.01); *B01D 2259/4575* (2013.01); *B64D 2041/005* (2013.01); *H01M 2250/20* (2013.01); *Y02T 90/32* (2013.01); *Y02T 90/36* (2013.01)

(58) Field of Classification Search
CPC ............ B01D 53/28; B01D 2259/4575; B01D 53/268; B64D 37/32; B64D 2041/005; Y02T 90/36; Y02T 90/32; Y02E 60/50; H01M 8/04164; H01M 2250/20
See application file for complete search history.

(56) References Cited

U.S. PATENT DOCUMENTS 4,903,503 A * 2/1990 Meckler .................. F02G 1/043
62/238.3
5,131,238 A * 7/1992 Meckler .................. F02G 1/043
62/271

(Continued)

FOREIGN PATENT DOCUMENTS

| DE | 4323719 C2 | 6/1995 |
|---|---|---|
| DE | 4302319 C2 | 3/1996 |

(Continued)

OTHER PUBLICATIONS

Jiang "Porous Graphene as the Ultimate Membrane for Gas Separation" 4019-4024, Nano Lett., vol. 9, No. 12, 2009.*

(Continued)

*Primary Examiner* — Anthony Shumate
(74) *Attorney, Agent, or Firm* — Hauptman Ham, LLP

(57) ABSTRACT

A dehumidifier comprises: a first channel for transporting air at a first pressure; a second channel for transporting air at a second pressure lower than the first pressure; and a graphene oxide barrier separating the first channel and the second channel. The relatively lower pressure of air in the second channel causes water vapor to be drawn out of the air in the first channel.

16 Claims, 4 Drawing Sheets

(56) References Cited

U.S. PATENT DOCUMENTS

| | | | |
|---|---|---|---|
| 5,181,387 A * | 1/1993 | Meckler | F02G 1/043 62/176.1 |
| 5,235,843 A * | 8/1993 | Langhorst | G01N 1/34 73/19.02 |
| 6,087,029 A * | 7/2000 | Golovin | B01D 53/22 429/407 |
| 6,293,121 B1 * | 9/2001 | Labrador | B01D 61/10 62/304 |
| 7,759,011 B2 | 7/2010 | Hoffjann et al. | |
| 8,256,524 B2 | 9/2012 | Bleil et al. | |
| 8,372,554 B2 | 2/2013 | Hoffjann et al. | |
| 8,500,960 B2 * | 8/2013 | Ehrenberg | B01D 61/364 202/168 |
| 8,623,559 B2 | 1/2014 | Frahm et al. | |
| 2007/0111060 A1 | 5/2007 | Hoffjann et al. | |
| 2008/0057368 A1 * | 3/2008 | McElroy | H01M 8/0252 429/414 |
| 2008/0223212 A1 * | 9/2008 | Crowder | B01D 53/22 95/52 |
| 2010/0047634 A1 * | 2/2010 | Nguyen | H01M 8/04022 429/513 |
| 2010/0212503 A1 | 8/2010 | Yoshimune et al. | |
| 2011/0062082 A1 * | 3/2011 | Mordukhovich | B01D 61/58 210/651 |
| 2012/0118147 A1 * | 5/2012 | Claridge | B01D 53/268 95/52 |
| 2012/0304862 A1 * | 12/2012 | Taylor | B01D 53/268 96/8 |
| 2013/0056177 A1 * | 3/2013 | Coutu | F28D 19/042 165/96 |
| 2014/0150287 A1 * | 6/2014 | Ahn | B01D 53/268 34/474 |
| 2014/0157985 A1 * | 6/2014 | Scovazzo | B01D 53/22 95/52 |
| 2015/0231577 A1 * | 8/2015 | Nair | B01D 71/024 210/640 |
| 2016/0074814 A1 * | 3/2016 | Park | B01D 69/12 210/500.33 |
| 2016/0158694 A1 * | 6/2016 | Ehrenberg | B01D 53/268 95/52 |

FOREIGN PATENT DOCUMENTS

| | | |
|---|---|---|
| DE | 10249588 A1 | 5/2004 |
| DE | 10 2005 054885 A1 | 5/2007 |
| DE | 102006034816 A1 | 1/2008 |
| DE | 10 2007 046 381 A1 | 4/2009 |
| WO | WO 2008089484 A1 * | 7/2008 ........... B01D 61/364 |
| WO | 2009/158030 A1 | 12/2009 |
| WO | 2011/036027 A1 | 3/2011 |

OTHER PUBLICATIONS

UKIPO Search Report dated May 12, 2014 in GB Application No. 1319338.8, 1 page.

* cited by examiner

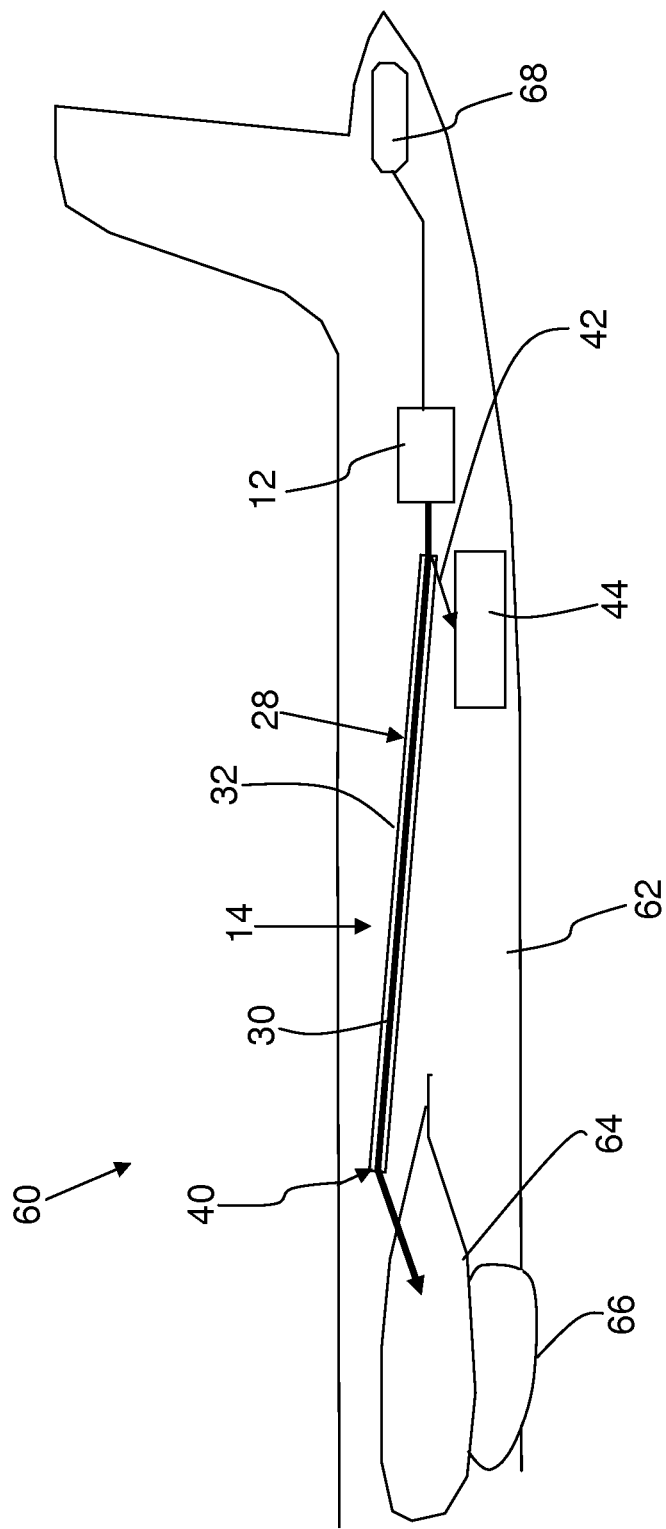

DEHUMIDIFIER

RELATED APPLICATIONS

The present application claims priority from Great Britain Application Number 1319338.8, filed, Nov. 1, 2013, the disclosure of which is hereby incorporated by reference herein in its entirety.

FIELD OF THE INVENTION

The invention relates to a dehumidifier, and a method of dehumidifying air.

BACKGROUND OF THE INVENTION

It is often useful or necessary to reduce the amount of water or water vapour in air to reduce its humidity. An example of such a need is in a fuel tank, such as an aircraft fuel tank, where it is desirable to reduce the amount of water available to mix with fuel in the fuel tank.

SUMMARY OF THE INVENTION

A first aspect of the invention provides a dehumidifier comprising: a first channel for transporting air at a first pressure; a second channel for transporting air at a second pressure lower than the first pressure; and a graphene oxide barrier separating the first channel and the second channel; wherein the relatively lower pressure of air in the second channel causes water vapour to be drawn out of the air in the first channel.

The first channel and the second channel may be elongate. The second channel may be formed concentrically around the first channel. The first channel and the second channel may be helical or planar.

The graphene oxide barrier may be a graphene oxide membrane.

A second aspect of the invention provides a system for supplying inert gas to a fuel tank, the system comprising: a dehumidifier as described above; a fuel cell configured to generate oxygen-depleted air to be fed into the first channel of the dehumidifier, for dehumidifying; and a fuel tank for receiving and containing the dehumidified oxygen-depleted air. The fuel cell may be a hydrogen fuel cell.

The system may include a vent between the dehumidifier and the fuel tank, the vent configured to vent the dehumidified oxygen-depleted air when the flow of dehumidified oxygen-depleted air into the fuel tank reaches a predefined level.

The system may include an air inlet for allowing the ingress of vent air into the second channel of the dehumidifier. The vent air may be relatively colder than the oxygen-depleted air. The vent air may be at a relatively lower pressure than the oxygen-depleted air.

The system may include a water outlet formed at a first end of the dehumidifier, wherein the dehumidifier is inclined such that the water outlet is lower than a second end of the dehumidifier.

The system may include a water tank for receiving and containing the water drawn out of, or condensed from, the air in the second channel.

A third aspect of the invention provides a vehicle comprising the system described above. The vehicle may be an aircraft. The aircraft may have an air inlet configured to allow the ingress of air from outside the aircraft.

A fourth aspect of the invention provides a method of dehumidifying air, the method comprising: providing a dehumidifier having a first channel, a second channel and a graphene oxide barrier separating the first channel and the second channel; generating a flow of air at a first pressure in the first channel; and generating a flow of air at a second pressure in the second channel, the second pressure being lower than the first channel such that water is drawn out from the air in the first channel, through the graphene oxide barrier and into the second channel. The air flowing into the first channel may be oxygen-depleted air. The method may include: receiving, in a water tank, the water drawn out, or condensed, from the oxygen-depleted air.

The temperature and/or pressure of air flowing in the second channel may be lower relative to the temperature and/or pressure of air flowing in the first channel.

A fifth aspect of the invention provides a method of supplying inert gas to a fuel tank, the method comprising: generating, in a fuel cell, oxygen-depleted air; dehumidifying the oxygen-depleted air as described above; and receiving, in a fuel tank, the dehumidified oxygen-depleted air.

It will be appreciated that the features of the various aspects of the invention may be combined with those of other aspects of the invention.

BRIEF DESCRIPTION OF THE DRAWINGS

Embodiments of the invention will now be described with reference to the accompanying drawings, in which:

FIG. 3 is a side view of part of an aircraft incorporating the dehumidifier of FIGS. 2A and 2B.

DETAILED DESCRIPTION OF EMBODIMENT(S)

Figure 1:
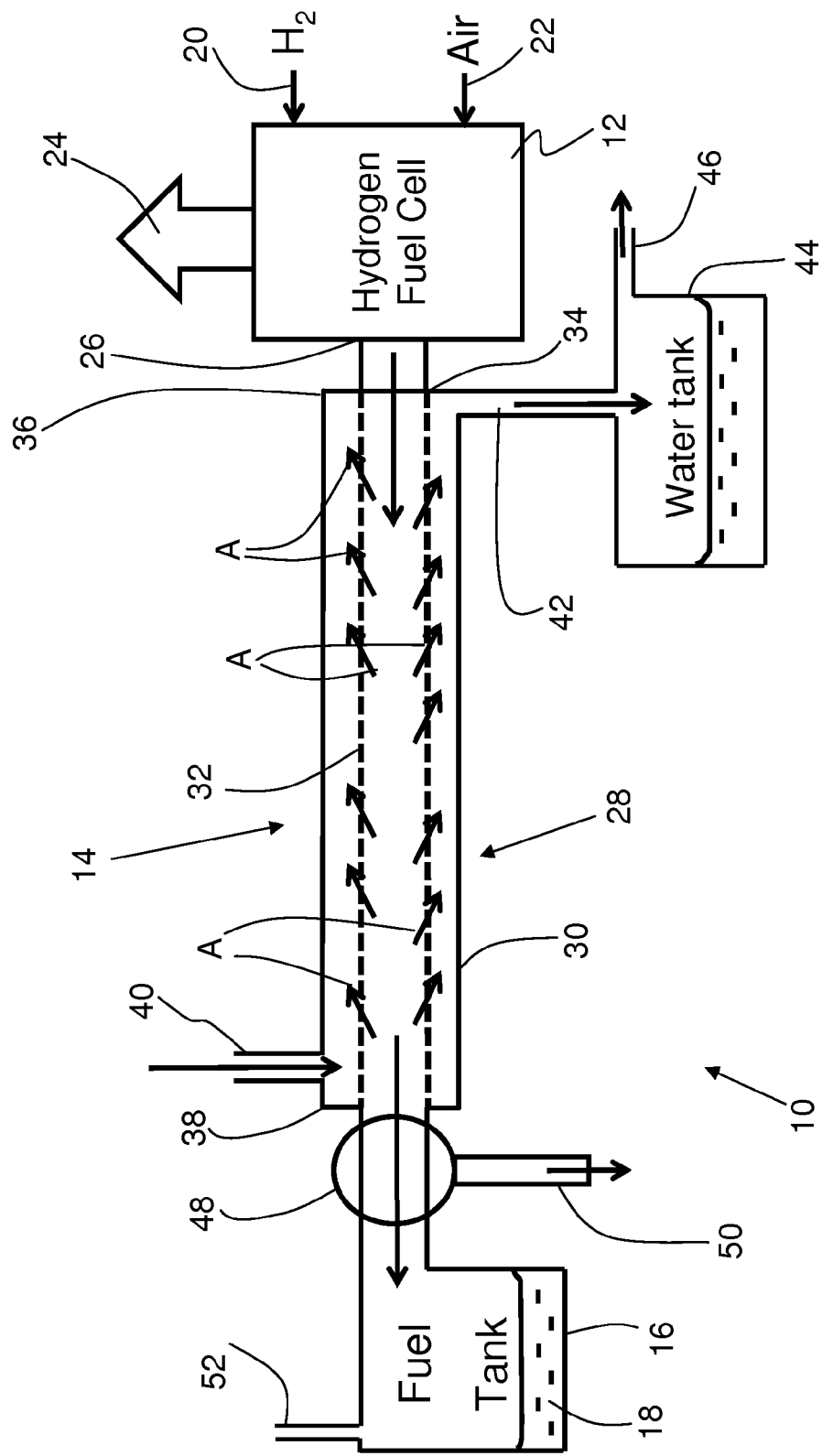
FIG. 1 is a schematic view of an inerting system.

Referring to the drawings, FIG. 1 shows a system for supplying inert gas to a fuel tank, or inerting system 10. In this particular embodiment, the inerting system 10 is described in the context of a system for inerting air in a fuel tank of an aircraft. However, it will be appreciated by those skilled in the relevant field that the inerting system 10 could alternatively be incorporated into, for example, a building or a land or sea vehicle.

The inerting system 10 includes a fuel cell 12, a dehumidifier apparatus 14 and a fuel tank 16 for containing fuel 18. The fuel cell 12 is in fluid communication with the fuel tank 16 via the dehumidifier apparatus 14. The fuel cell 12 is configured to receive hydrogen via a hydrogen input 20 and air via an air input 22. The hydrogen supplied to the fuel cell 12 may be stored under pressure in a hydrogen canister (not shown). The air supplied to the fuel cell 12 may be engine bleed air, directed to the fuel cell from an engine of the aircraft, compressed air stored under pressure in an air canister (not shown), or air pumped into the fuel cell from some other source, for example from outside the aircraft or from within the cabin of the aircraft. Within the fuel cell 12, hydrogen is catalytically reacted with oxygen in the air to produce electricity which can be provided to the aircraft via a connection 24 to be used by the aircraft while on the ground, for example for ground propulsion, or while airborne, for example for emergency power or lighting.

A by-product of the generation of electricity by the fuel cell 12 is oxygen-depleted air (ODA), which typically has an oxygen concentration of less than around 10.5%. The oxygen-depleted air is directed via the dehumidifier apparatus 14 into the fuel tank 16 in order to reduce the amount of oxygen in the fuel tank, thereby reducing the flammability of the fuel 18 in the fuel tank. The oxygen-depleted air generated by the fuel cell 12 typically has a temperature of around 80 degrees and typically has a humidity of around 100% due to the catalytic process via which it is produced. Therefore, prior to feeding the oxygen-depleted air into the fuel tank, it is advantageous to reduce the temperature and/or the humidity of the oxygen-depleted air. It will be appreciated that some reduction in the temperature of the oxygen-depleted air will occur naturally as the oxygen-depleted air moves between the fuel cell 12 and the fuel tank 16. However, it may be advantageous to further reduce the temperature. Both the humidity and the temperature of the oxygen-depleted air may be reduced using the dehumidifier apparatus 14 as will now be discussed.

In this embodiment, the dehumidifier apparatus 14 includes a double-walled tube 28 having a generally cylindrical shape and including an outer tube 30 and an inner tube 32. The inner tube 32 forms a first channel for transporting air, such as oxygen-depleted air, and the outer tube 30 and the inner tube 32 define a second channel for transporting air. In some embodiments, the outer tube 30 is formed of metal. In other embodiments, the outer tube 30 may be formed of plastics material or any other material suitable for transporting fluids such as water and air. The inner tube 32 is connected to the outer tube 30 using known means, for example spokes or connectors (not shown) extending between the inner tube and the outer tube. The inner tube 32 is formed of graphene oxide. Graphene oxide is an oxidised form of graphene, which typically takes the form of a sheet formed of a single atomic layer of carbon, where each carbon atom is bonded to two oxygen atoms. Graphene oxide is permeable to water and water vapour, but is impermeable to almost all other fluids, including air. In some embodiments, the graphene oxide inner tube is supported on a porous structural former (not shown).

An inlet 34 is provided at first end 36 of the tube 28 through which oxygen-depleted air is able to enter the dehumidifier apparatus 14 from the fuel cell 12. A second end 38 of the tube 28 is connected to the fuel tank 16. A vent air inlet 40 is formed at the second end 38 of the tube 28, and allows air from outside the aircraft to flow into the second channel of the tube in a direction opposite to the direction of flow of air in the first channel. When the aircraft is in flight, the air from outside the aircraft can be directed into the vent air inlet 40 as the aircraft moves forward. However, when the aircraft is not airborne, air may be obtained via some other source, such as a fan located within the aircraft, and pumped from the second channel of the tube.

A water outlet 42 is provided at the first end 36 of the tube 28, and connects the tube to a water tank 44 which is configured to collect water drawn from the oxygen-depleted air, as will be discussed below. In some embodiments, the water drawn from the oxygen-depleted air is fed into the aircraft for use in various aircraft systems. A vent air outlet 46 allows ambient air to exit the water tank 44, after the ambient air has passed through the tube 28. Although not shown as such in FIG. 1, the tube 28 is inclined relative to horizontal so that the tube slopes towards the first end 36. This allows water drawn out from the oxygen-depleted air in the first channel to flow towards the water outlet 42 and into the water tank 44.

A regulator valve 48 is located between the dehumidifier apparatus 14 and the fuel tank 16, and is configured to restrict the amount of oxygen-depleted air that is able to enter the fuel tank. In some embodiments, the regulator valve 48 restricts the amount of oxygen-depleted air entering the fuel tank when the flow of oxygen-depleted air into the fuel tank exceeds a predefined level. Typically, when the flow of oxygen-depleted air into the fuel tank 16 is such that the air in the fuel tank has an oxygen content of less than about 12%, then the regulator valve 48 restricts the flow of oxygen-depleted air into the fuel tank. The flow rate of ODA into the fuel tank 16 is restricted to around, or slightly greater than, the rate at which the fuel 18 is burnt by the aircraft to avoid excess fuel vapour being vented to the air outside the aircraft. Any excess oxygen-depleted air that passes through the dehumidifier apparatus 14 and is restricted from entering the fuel tank 16 is ejected from the system 10 via an exhaust 50. An atmospheric vent 52 provides a fluid communication link between the fuel tank 16 and the air surrounding the aircraft, thereby allowing the pressure in the fuel tank to be equalised with the air outside the aircraft.

In the embodiment described above, air from outside the aircraft flows in the second channel in the opposite direction to the oxygen-depleted air flowing in the first channel. In another embodiment, however, the vent air inlet 40 is located at the first end 36 of the dehumidifier 14, and the vent air outlet 42 is located at the second end 38 of the dehumidifier. In that embodiment, the flow air from outside the aircraft along the second channel is in the same direction as the direction of the flow of oxygen-depleted air in the first channel.

In use, oxygen-depleted air that is output from the fuel cell 12 enters the first channel formed by the graphene oxide inner tube 32 of the dehumidifier apparatus 14. Air from outside the aircraft flows into the vent air inlet 40. The air is able to flow along the length of the tube 28 in the second channel, formed between the outer tube 30 and the inner tube 32, but is not able to pass through the impermeable wall of the inner tube since graphene oxide is impermeable to air. The pressure of air surrounding aircraft in flight at cruise altitude is typically around 2.7 p.s.i., which is significantly lower than that of the oxygen-depleted air, which exits the fuel cell 12 at a pressure of around 16 p.s.i. Thus, the pressure of fluid in the region between the graphene oxide inner tube 32 and the outer tube 30 is significantly lower than that of the fluid within the inner tube. The relatively lower pressure causes water vapour in the oxygen-depleted air to be drawn out of the inner tube 32, through the graphene oxide, and into the second channel formed in the region between the inner tube and the outer tube 30, as depicted by arrows A. Most other liquids and gases within the inner tube 32, including all of the constituents of oxygen-depleted air, are unable to pass through the graphene oxide, so remain in the first channel formed by the inner tube.

While the aircraft is at cruise altitude, the ambient air surrounding the aircraft is typically at a temperature of around minus 50 degrees centigrade, which is significantly cooler than the oxygen-depleted air which typically has a temperature of around 80 degrees centigrade as it exits the fuel cell 12. The relatively cooler ambient air flowing in the second channel between the inner tube 32 and the outer tube 30 causes a decrease in the temperature of the oxygen-depleted air flowing within the inner tube such that, when the oxygen-depleted air reaches the fuel tank 16, its temperature has decreased sufficiently to significantly reduce the flammability of the fuel 18. Ideally, the temperature of the oxygen-depleted air in the fuel tank is between around 5 degrees centigrade and 40 degrees centigrade. Furthermore, the oxygen-depleted air that reaches the fuel tank 16 is significantly less humid than the air entering the dehumidifier apparatus 14.

The dehumidifier apparatus 14 is inclined relative to horizontal, such that water drawn out of the oxygen-depleted air flows along the tube 28 towards the water tank 44. More specifically, the dehumidifier apparatus 14 is arranged such that the water outlet 42 at the first end 36 of the tube 28 is lower than the second end 38 of the tube, such that gravity causes water in the second channel to flow towards the water outlet 42 and to drip into the water tank 44. The air from outside the aircraft flowing the second channel flows through the water tank 44 and exits the system 10 via the vent air outlet 46. In some embodiments, a fan or pump (not shown) may be provided to aid the flow of ambient air and water along the tube 28 of the dehumidifier apparatus 14. A fan or pump also serves to reduce the pressure of air flowing in the second channel in the region between the inner tube 32 and the outer tube 30, thereby aiding the removal of water from the oxygen-depleted air flowing through the inner tube 32.

Figure 2A:
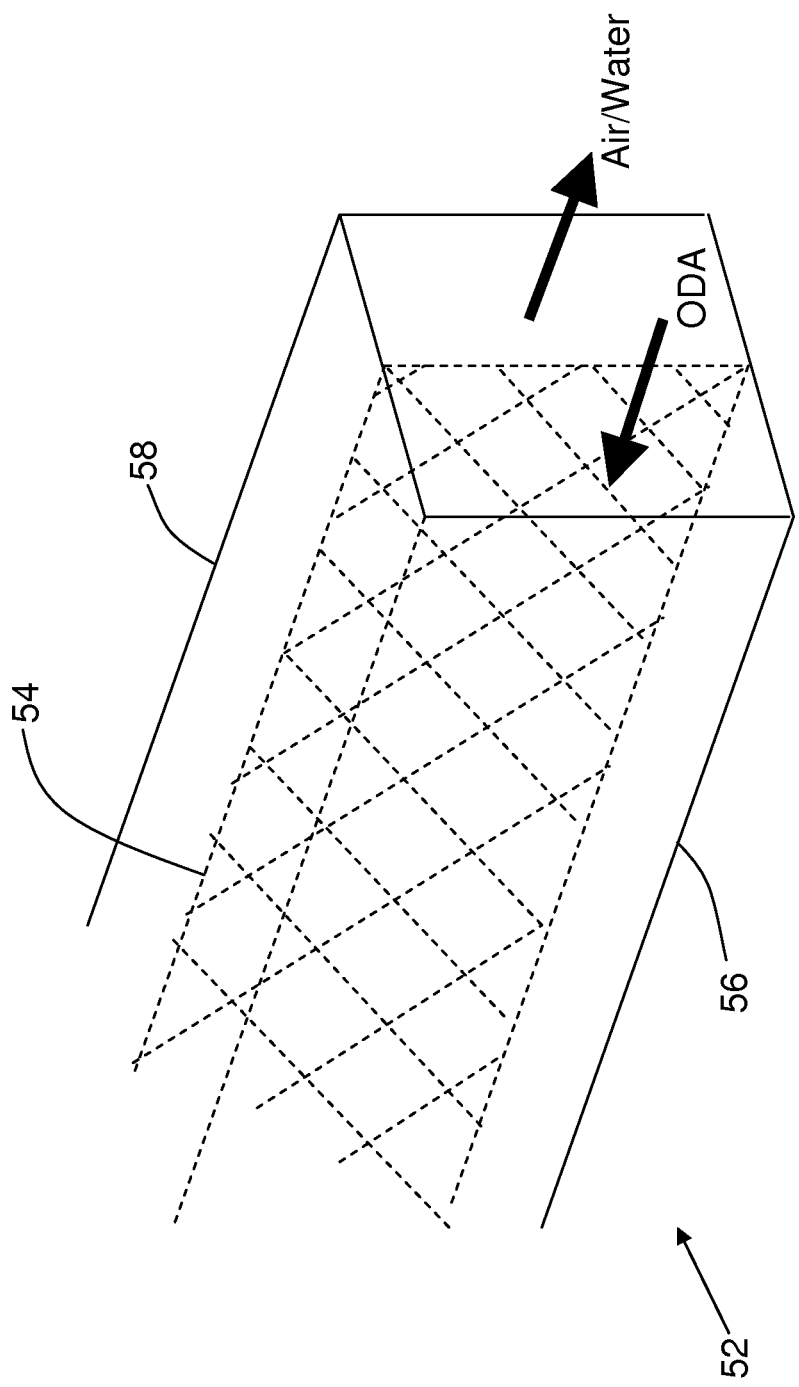
FIGS. 2A and 2B are schematic partial views of a dehumidifier for removing water vapour from a fluid.
Figure 2B:
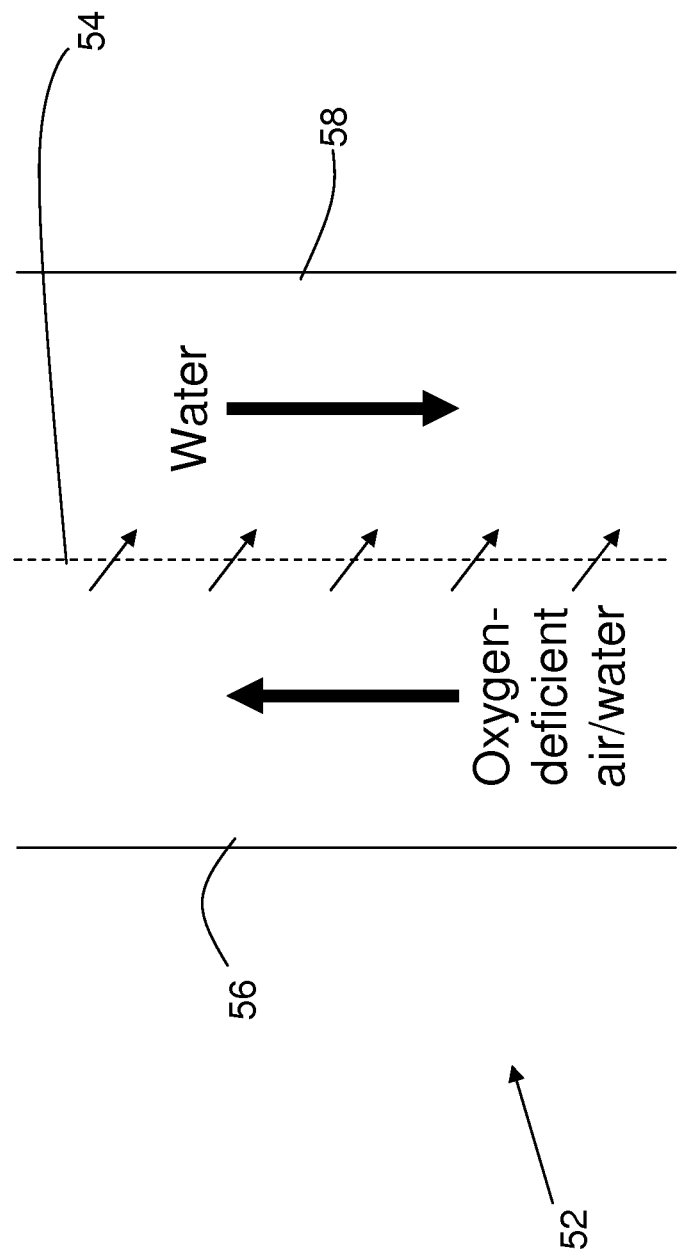

So far, the dehumidifier apparatus 14 has been described as a tubular arrangement having a generally cylindrical shape. However, in some embodiments, the dehumidifier apparatus 14 may not have a double-tube form. In one embodiment, shown in FIGS. 2A and 2B, the dehumidifier apparatus 14 includes a tube 52 having a generally square or rectangular cross section. The tube 52 is divided along its longitudinal axis by a horizontal or vertical graphene oxide wall 54, which forms a first channel 56, along which oxygen-depleted air is able to flow in a first direction, and a second channel 58, along which ambient air is able to flow in a second direction opposite to the first direction. In embodiments having a horizontally oriented graphene oxide wall 54, the oxygen-depleted air flows in the upper, or top channel. In some embodiments, the oxygen-depleted air in the first channel flows in the same direction as the air in the second direction.

As the ambient air flows along the second channel 58 of the tube 52, it reduces the temperature of the oxygen-depleted air flowing along the first channel 56. Furthermore, the ambient air is at a pressure significantly lower than that of the oxygen-depleted air and, as a consequence, water in the oxygen-depleted air is drawn out through the graphene oxide wall 54. The drawn-out water is then urged by the flow of ambient air along the second channel 56 towards the water tank 44. The cooled and less humid oxygen-depleted air flows along the first channel to the fuel tank 16.

FIG. 3 shows a side view of part of an aircraft 60 having a fuselage 62, wings 64 and engines 66. Only one wing 64 and engine 66 is shown. The wing 64 has a wing box which is bounded by front and rear spars; inboard and outboard ribs; and upper and lower covers, none of which is shown, but which together form the walls of the fuel tank 16. FIG. 3 illustrates schematically how the inerting system 10 might be incorporated into the aircraft 60. The inerting system 10 is not drawn to scale, and the various components of the inerting system may be located differently to how they are shown. In this embodiment, a hydrogen tank 68 supplies hydrogen to the fuel cell 12.

In some embodiments, a heater (not shown) is connected to the vent air inlet 40 to raise the temperature of the ambient air entering the dehumidifier apparatus 14, to ensure that the water drawn out through the graphene oxide inner tube does not freeze within the tube 28.

In the embodiments described above, the tube 28 of the dehumidifier apparatus 14 has been described as a single straight tube. However, in other embodiments, multiple tubes may be used to transport the oxygen-depleted air from the fuel cell 12 to the fuel tank 16.

A straight tube 28 as described above may have sufficient length between the fuel cell 12 and the fuel tank 16 for a sufficient decrease in humidity and temperature of the oxygen-depleted air. However, in an alternative embodiment, for example when the inerting system 10 is installed in shorter aircraft, the straight tube 28 may be replaced by a longer tube which is helical or coiled. In such an embodiment, the distance that the oxygen-depleted air has must travel between the fuel cell 12 and the fuel tank 16 is greater and, therefore, the oxygen-depleted air has longer to reduce in temperature and humidity. Alternatively, the tube 28 forming the first and second channels may be planar.

In another alternative embodiment, the tube 28 be comprise a single coiled tube located within the water tank 44. Cooling air can be passed through the water tank 44 so that the water vapour drawn out from the tube 28 is delivered directly into the water tank.

Although the invention has been described above with reference to one or more preferred embodiments, it will be appreciated that various changes or modifications may be made without departing from the scope of the invention as defined in the appended claims.

The invention claimed is:

1. A dehumidifier, comprising:
   a first channel for transporting air at a first pressure;
   a second channel for transporting air at a second pressure lower than the first pressure; and
   a graphene oxide barrier separating the first channel and the second channel;
   wherein the relatively lower pressure of air in the second channel causes water vapour to be drawn out of the air in the first channel, and wherein the first channel and the second channel are elongate and helical.

2. A system for supplying inert gas to a fuel tank, the system comprising:
   a dehumidifier comprising: a first channel for transporting air at a first pressure, a second channel for transporting air at a second pressure lower than the first pressure, and a graphene oxide barrier separating the first channel and the second channel, wherein the relatively lower pressure of air in the second channel causes water vapour to be drawn out of the air in the first channel;
   a fuel cell configured to generate oxygen-depleted air to be fed into the first channel of the dehumidifier, for dehumidifying; and
   a fuel tank for receiving and containing the dehumidified oxygen-depleted air.

3. A system according to claim 2, wherein the first channel and the second channel are elongate.

4. A system according to claim 2, wherein the second channel is formed concentrically around the first channel.

5. A system according to claim 2, wherein the graphene oxide barrier comprises a graphene oxide membrane.

6. A system according to claim 2, wherein the fuel cell is a hydrogen fuel cell.

7. A system according to claim 2, further comprising a vent between the dehumidifier and the fuel tank, the vent configured to vent the dehumidified oxygen-depleted air when the flow of dehumidified oxygen-depleted air into the fuel tank reaches a predefined level.

8. A system according to claim 2, further comprising an air inlet for allowing the ingress of vent air into the second channel of the dehumidifier, the vent air being relatively colder than the oxygen-depleted air.

9. A system according to claim 2, further comprising a water outlet formed at a first end of the dehumidifier, wherein the dehumidifier is inclined such that the water outlet is lower than a second end of the dehumidifier.

10. A system according to claim 2, further comprising a water tank for receiving and containing the water vapour drawn out of the air in the second channel.

11. A vehicle comprising the system of claim 2.

12. A vehicle according to claim 11, wherein the vehicle is an aircraft.

13. A vehicle according to claim 11, wherein the vehicle is an aircraft, wherein the system further comprises an air inlet allowing the ingress of vent air into the second channel of the dehumidifier, the vent air being relatively colder than the oxygen-depleted air, and wherein the air inlet is configured to allow the ingress of air from outside the aircraft.

14. A method of dehumidifying air, the method comprising:
providing a dehumidifier having a first channel, a second channel and a graphene oxide barrier separating the first channel and the second channel;
generating a flow of air at a first pressure in the first channel; and
generating a flow of air at a second pressure in the second channel, the second pressure being lower than the first pressure, such that water vapour is drawn out from the air in the first channel, through the graphene oxide barrier and into the second channel;
wherein the air flowing in the first channel is oxygen-depleted, and the method further comprises:
receiving, in a water tank, the water vapour drawn out from the oxygen-depleted air.

15. A method of dehumidifying air, the method comprising:
providing a dehumidifier having a first channel, a second channel and a graphene oxide barrier separating the first channel and the second channel;
generating a flow of air at a first pressure in the first channel; and
generating a flow of air at a second pressure in the second channel, the second pressure being lower than the first pressure, such that water vapour is drawn out from the air in the first channel, through the graphene oxide barrier and into the second channel;
wherein the temperature of air flowing in the second channel is lower relative to the temperature of air flowing in the first channel.

16. A method of supplying inert gas to a fuel tank, the method comprising:
generating, in a fuel cell, oxygen-depleted air;
dehumidifying the oxygen-depleted air, the method of dehumidifying the oxygen-depleted air comprising: providing a dehumidifier having a first channel, a second channel and a graphene oxide barrier separating the first channel and the second channel, generating a flow of oxygen-depleted air at a first pressure in the first channel, and generating a flow of air at a second pressure in the second channel, the second pressure being lower than the first pressure, such that water vapour is drawn out from the oxygen-depleted air in the first channel, through the graphene oxide barrier and into the second channel; and
receiving, in a fuel tank, the dehumidified oxygen-depleted air.

* * * * *